Jan. 13, 1925.　　　　　　　　　　　　　　　　　　　　1,522,769
F. DUSTAN
WHEEL TURNING LATHE
Filed June 14, 1921　　　3 Sheets-Sheet 1
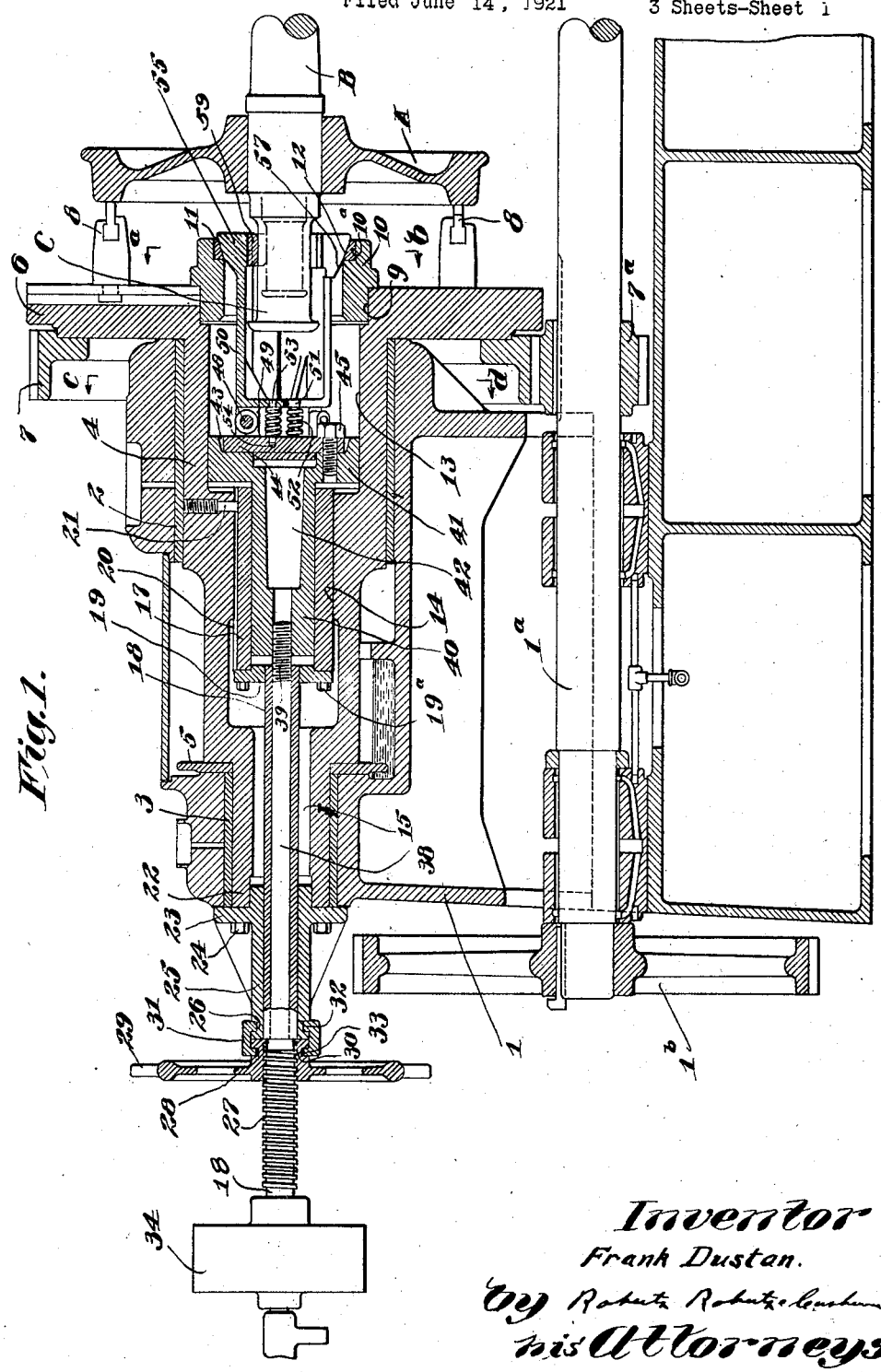

Jan. 13, 1925. 1,522,769
F. DUSTAN
WHEEL TURNING LATHE
Filed June 14, 1921 3 Sheets-Sheet 2
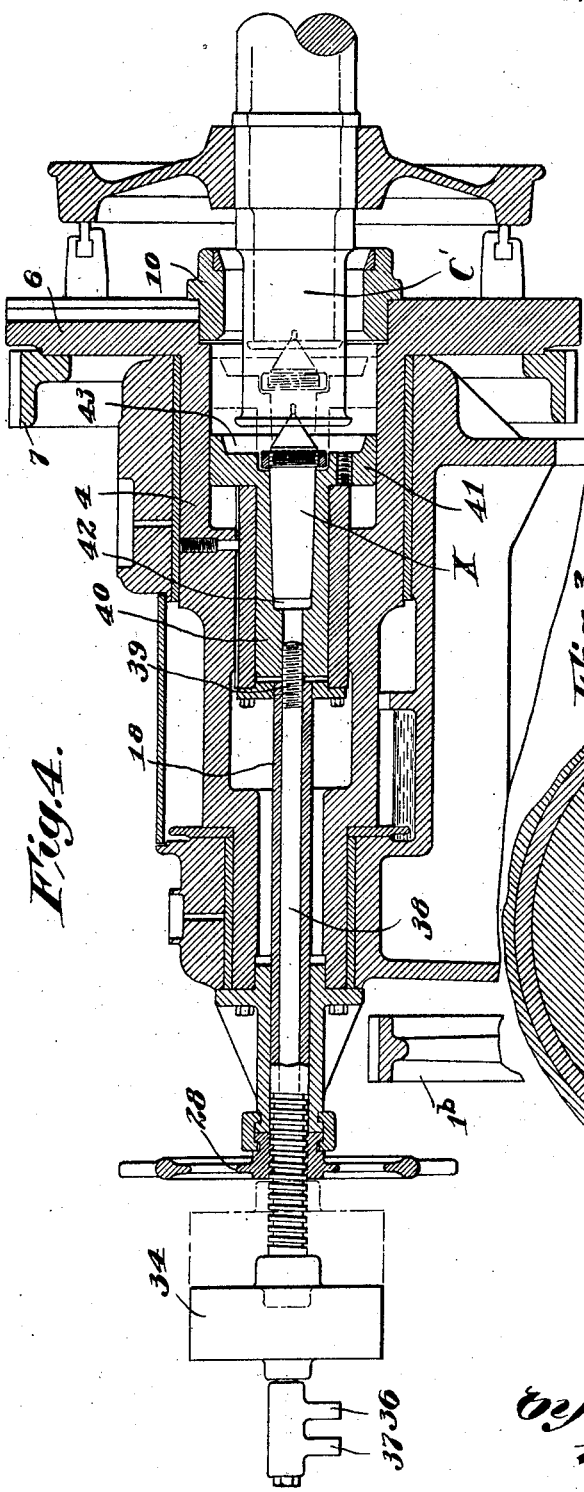
Inventor
Frank Dustan
by Roberts Roberts Cushman
his Attorneys Jan. 13, 1925.
F. DUSTAN
1,522,769
WHEEL TURNING LATHE
Filed June 14, 1921 3 Sheets-Sheet 3
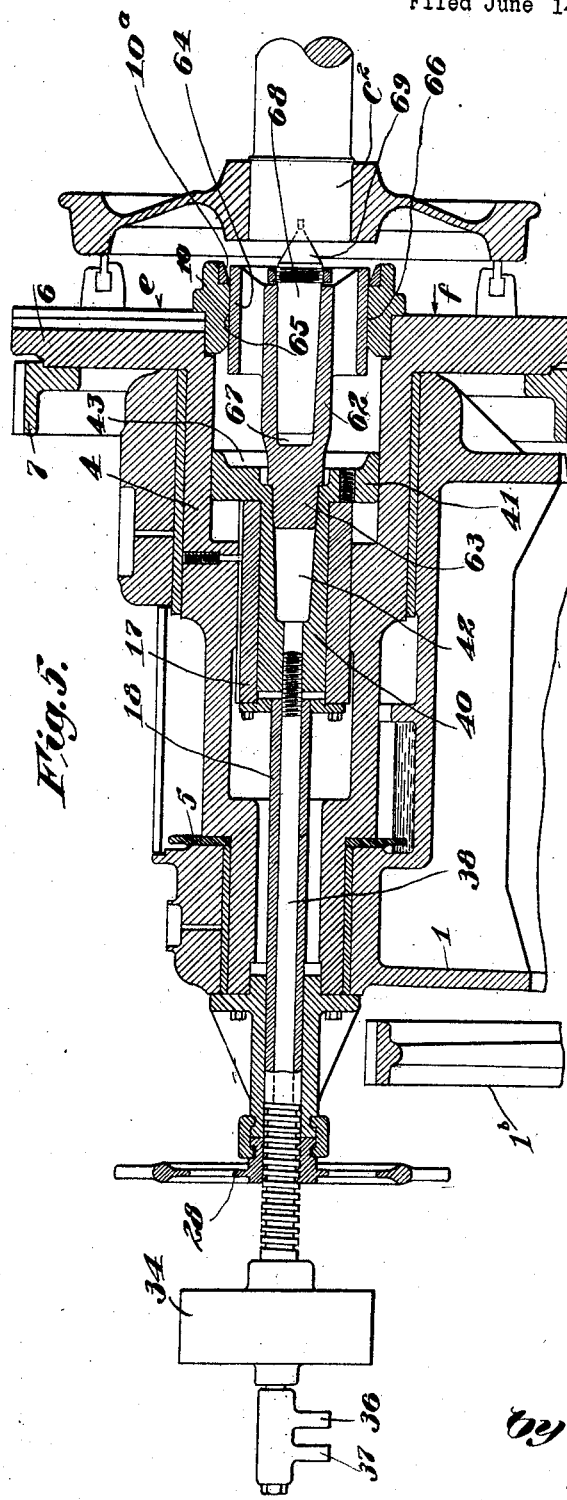
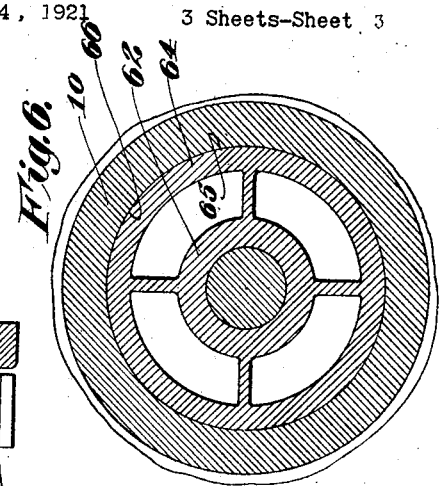
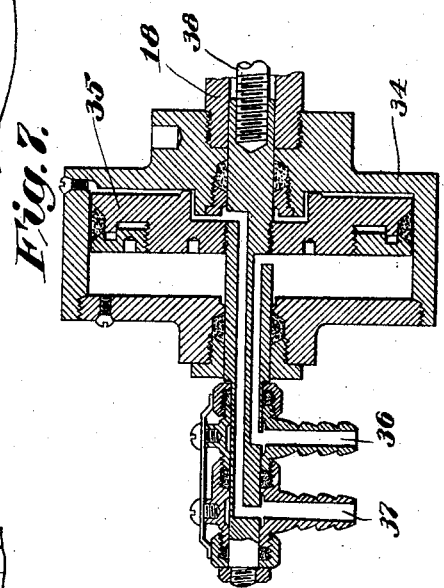
Inventor
Frank Dustan.
By Roberts, Roberts & Cushman
his Attorneys Patented Jan. 13, 1925.

1,522,769

UNITED STATES PATENT OFFICE.

FRANK DUSTAN, OF LUNENBURG, MASSACHUSETTS, ASSIGNOR TO MANNING, MAXWELL & MOORE, INC., OF NEW YORK, N. Y., A CORPORATION OF NEW JERSEY.

WHEEL-TURNING LATHE.

Application filed June 14, 1921. Serial No. 477,446.

*To all whom it may concern:*

Be it known that I, FRANK DUSTAN, a citizen of the United States of America, and resident of Lunenburg, in the county of Worcester and State of Massachusetts, have invented new and useful Improvements in Wheel-Turning Lathes, of which the following is a specification.

This invention relates to coach, truck and locomotive trailer wheel lathes and more particularly to work centering means therefor.

Machines of this character are employed for the turning down of the tires of railway coach, truck and locomotive trailer wheels in order to reduce the wearing surface of such tires to the proper contour. Commonly such wheels are fixedly secured to their axles, and it is thus necessary, in dressing a tire, to mount a pair of wheels with their connecting axle in the lathe. It is, of course, desirable to turn down the wheels so that the tread surfaces shall be concentric with the axis of the wheel journal, and thus it is requisite to provide the lathe with centering means for such journals. As the journal surfaces of the axles are turned smooth and true, it is impracticable to apply to such axles the usual form of centering and driving chuck, as to do so might result in the scoring or roughening of the journal surface. One mode of centering coach-wheel axles without employing a chuck has been to provide the lathe with a face plate having a central opening of a size sufficient to receive the journal portion of the axle. For centering the journal in such opening, a so-called "journal bushing" has been employed, said bushing consisting of an accurately machined collar, longitudinally split into two or more segments, the segments being secured together by a spring band or similar means. While this arrangement is satisfactory, in so far as the accurate centering of the journal is concerned, it is necessary for the workman to apply such bushing manually to the journal preparatory to mounting the axle in the lathe. The parts of such bushing are necessarily heavy and the spring band employed is of such strength as to require the exertion of considerable force in snapping the assembled bushing over the end of the axle. The difficulty in applying the bushing thus slows down and increases the cost of the process. Furthermore, the bushings are relatively expensive, and after a short period of service, are in many cases, rendered useless by the rough handling accorded them by the workmen. As it is necessary to provide a complete bushing for each journal, the maintenance of a proper equipment of such bushings thus becomes a matter of considerable moment. When the turning operation is completed, it is often a difficult matter to remove the bushing and the workman frequently injures the journal surface in attempting to pry the bushing off.

The principal object of the invention is to overcome the difficulties incident to the employment of a "journal bushing" such as above described and to expedite the process of centering the wheel axle in the lathe, while at the same time avoiding the use of means such as might cause injury to the finished journal surface, as well as reducing to a large degree the expense of upkeep of the appliances employed. As one mode of attaining this object, the lathe may have an internal spindle aligning with the usual central opening in the face plate, and to such spindle may be secured a jaw supporting plate. A plurality of movable jaws may be mounted on this plate, suitable means, such for example as a pneumatic cylinder, being provided for expanding and contracting these jaws. The opposed faces of the jaws may be provided with dovetail slots or equivalent means whereby bearing shoes of different sizes, for use in centering journals of different diameters, may be connected thereto, such shoes having smooth, journal engaging faces. The shoes may be relatively small and light as compared with the bushing segments previously employed, and thus may be made at less initial expense, and by reason of the greater ease in handling them, they are less liable to injury by carelessness on the part of the workman. The face plate of the lathe may be provided with any desired type of wheel engaging driving dog, by means of which the wheel and axle are rotated during the turning operation, thus avoiding any possibility of injury to the journal surface by the application of driving pressure thereto.

While the opening in the face plate is usually of a diameter to accommodate journals of ordinary sizes, it may not be sufficiently large to house centering jaws of a size to accommodate very large journals, such as those of locomotive trailers. A further object of the invention is to provide means whereby such large journals, or in fact any shaft which it is desired to support on centers, may be mounted in the lathe without substantial change in the latter. To this end the jaw carrying plate may be so connected to the internal spindle as to permit of its ready separation therefrom, and the latter spindle may be formed with a conical socket for the reception of a lathe center of usual form.

As the journals of pony truck wheels are located between the wheels, it is also necessary to mount the axles for such wheels on centers. Moreover, as the axle terminates substantially in the plane of the outer face of the wheel, it is necessary that the lathe center project beyond the face plate, but with a lathe of the type hereinbefore described, the presence of the large opening at the center of the face plate makes it difficult properly to support a lathe center at the desired position for such work. A further object of the present invention is to provide a lathe of the type referred to above with means whereby a protruding center may be properly supported with relation to the lathe spindle and face plate. As one mode of accomplishing this result, an extension spindle may be provided, such spindle having a conical portion to interfit with the socket of the aforementioned internal spindle, and with a cylindrical enlargement or head adapted slidingly to engage the inner wall of the opening of the face plate and to be centered thereby. Such extension spindle or the head portion thereof may be provided with a conical socket or other suitable device for retaining an ordinary lathe center in proper relation thereto. As conducive to the efficient employment of the lathe when using centers in accordance with either of the above arrangements, the internal spindle of the lathe may be so mounted as to permit of its longitudinal adjustment, thus permitting the proper positioning of the center in accordance with the requirements of the work.

A preferred arrangement for carrying the above objects into effect is illustrated in the accompanying drawings, in which—

Fig. 1 is a longitudinal cross section through the head-stock end of the lathe illustrating the centering device as holding the end of a coach wheel axle in operative position;

Fig. 2 is a transverse cross section on the line *a—b* of Fig. 1;

Fig. 3 is a transverse cross section on the line *c—d* of Fig. 1;

Fig. 4 is a longitudinal cross section similar to Fig. 1 but illustrating a device as arranged for manipulating work of large size and showing the centering device as removed and a lathe center as replacing the same;

Fig. 5 is also a longitudinal cross section illustrating a device as arranged for operation upon wheels having internal journals and showing the application of an extension spindle provided with a lathe center;

Fig. 6 is a transverse cross section taken on a line *e—f* of Fig. 5; and

Fig. 7 is a detail longitudinal cross section to enlarged scale illustrating the interior construction of a motor device employed.

The supporting frame of the head stock of the lathe is indicated at 1, it being understood however that the tail stock and associated parts, not herein illustrated, are of substantially duplicate construction, the only essential difference being that the tail stock is longitudinally movable in well known manner along the lathe bed. The lathe is provided with a longitudinally extending drive shaft 1ª having a gear 1ᵇ by means of which it is driven, and having pinions such as 7ª for imparting movement to the head and tail stock spindles, respectively. The head and tail stock frames are each provided with bearings, such as 2, 3, wherein are mounted hollow spindles such as 4. As the head and tail stocks are of substantially like construction as above pointed out, the following description will be confined to an explanation of the head stock mechanism as illustrated.

At 5 is indicated a thrust bearing for taking up end-thrust of the spindle. As herein described, the spindle is provided with an end face plate 6 having secured thereto the driving gear 7 meshing with the pinion 7ª on drive shaft 1ª. Such face plate may serve to support work-engaging dogs 8 of any desired character, but preferably of an automatic type. The face plate is provided with a central aperture 9 in which is seated a collar 10, such collar being provided with a seat 10ª in which is mounted an annular ring 11, having its inner surface bevelled as indicated at 12, to provide a cam face. The spindle 4 is provided with a bore which decreases progressively in diameter from the face plate toward its opposite end, as indicated at 13, 14 and 15, respectively. A sleeve device is mounted within the spindle, such device comprising the parts 17 and 18 secured together as by means of the plate 19 and bolts 19ª. The part 17 is of a diameter such as to fit within the portion 14 of the bore of the hollow spindle 4, being slidable longitudinally therein. This part 17 of the sleeve device is provided with a longitudinal groove 20 with which engages a key member 21, whereby the sleeve device is caused to rotate with the spindle 4. To the end 22 of the spindle 4 is secured a plate 23, bolts 24 being provided for securing such parts together. Integral with the plate 23 is a sleeve 25 which surrounds the outer portion 18 of the aforementioned sleeve device, and adjacent its outer extremity said sleeve 25 is provided with an annular groove 26. The outer end of the sleeve member 18 is externally screw-threaded as indicated at 27, and engaging such screw-threaded portion is a nut device 28 preferably in the form of a wheel having handles 29 whereby it may be turned. The hub of the nut 28 is provided with an annular groove 30. At 31 is indicated a collar having flanges 32, 33 which engage in the groove 26, 30, respectively, whereby to prevent endwise movement of the nut 28 relative to the member 25 while permitting rotation of such nut.

To the outer extremity of the member 18 is secured a cylinder 34 having therein a piston 35, and at 36, 37, respectively, are indicated inlets for admitting pressure fluid to the opposite sides of the piston. Any usual and well known form of valve mechanism may be employed for the manual control of the admission of fluid through the inlets 36, 37, whereby to cause a reciprocation of the piston 35 in the cylinder 34. Secured to the piston 35 is one end of a rod 38 which passes through the sleeve member 18 and has screw-threaded engagement as indicated at 39 with an internal spindle device 40.

This internal spindle device comprises a substantially cylindrical portion slidable within the sleeve member 17, and also a portion 41 of cylindrical form but of greater diameter. Extending inwardly from the larger end of the portion 41 is a conical and axial socket 42, having a taper suitable for engagement with a lathe center of ordinary form. The enlarged portion 41 of the spindle 40 is of a diameter slidably to engage the inner surface of the bore 13 in the spindle 4, whereby such enlarged portion is properly guided, but is limited in its outward movement by engagement with ring 10. The outer face of the member 41 is preferably provided with a circular recess 43 within which is seated a plate 44. Bolts, as 45, are provided whereby such plate may be removably secured to the member 41. The plate 44 constitutes a support for a centering chuck and for this purpose is provided with a plurality of pairs of outstanding lugs 46, the lugs of each pair being furnished with aligned openings 47. These openings serve for the reception of pintle pins, such as 48, upon which are journalled lugs 49 projecting from bell crank levers comprising the long arms 50 and the relatively short arms 51. The arms 51 of each of such levers normally extend substantially parallel to the outer face of the plate 44, and secured in such arm is a pin 53 which serves to center a coil spring 52 interposed between the arm 51 and the adjacent surface of the plate 44. The plate 44 may be provided with openings such as 54, within which are secured pins aligning with pins 53 and serving to position the opposite ends of the springs 52.

The long arms 50 of the bell crank levers are provided with enlargements 55 at their outer extremities, such enlargements being furnished with cam faces 57, constructed and arranged respectively to engage the cam face 12 of the ring 11 above described. The opposite (and inner) faces of the enlargements 55 are formed with dove-tailed grooves 58. Work-engaging shoes 59 are provided, such shoes having ribs 60 engageable with the grooves 58 and whereby such shoes may be removably secured to the lever members 50. The inner face of each of the shoes 59 is substantially smooth and preferably formed on a circular arc, as indicated at 61, whereby properly to engage the work.

In the operation of the mechanism as thus far described, it being assumed that the device is to be employed in the turning of coach wheels such as indicated at A, having axles B and external journals C, the mechanism will be arranged as indicated at Fig. 1, wherein the plate 44 is shown as secured to the internal spindle 40, and the centering jaws are shown as lying within the opening in the face plate and with their cam surfaces 57 engaging the cam surface of the ring 11. In setting up the work in the lathe the wheels are slung into position so that the journal C enters the chuck at the head stock end. The tail stock of the lathe is then brought into position, thus entering the opposite journal in the centering chuck of the tail stock. As the springs 52 serve normally to expand the centering jaws of the chuck, it is evident that the journal C may pass freely between such jaws. The operator now manipulates the proper valve mechanism whereby admitting air or other pressure fluid to the cylinder 34 at each end of the machine. As each of such cylinders is normally fixed as respects movement longitudinally of the lathe spindle, except by manipulation of the hand wheel on the nut 28, the admission of pressure fluid to the right hand end of a cylinder such as herein illustrated will cause the movement of the piston 35 to the left, thus pulling upon the rod 38, and thereby through the internal spindle 40 and plate 44 retracting the chuck jaws within the spindle. The cam surfaces of such jaws, by engagement with the cam surface of the ring 11, serve positively and simultaneously to move such jaws inwardly whereby the work-engaging shoes are caused to bear upon the journal surface C. As these shoes are substantially smooth they have no tendency to bite into the journal surface but merely serve to center such journal relatively to the spindle of the lathe. The driving dogs 8 are now brought into contact with the outer faces of the wheels and the tires are turned down in the usual manner. Upon the completion of the turning operation, manipulation of the proper valves permits pressure fluid to enter the left-hand end of the cylinder 34, thus moving the rod 38 to the right and projecting the jaws of the chuck outwardly from the face plate, thus enabling the springs 52 to expand the jaws whereby the work may be freely removed from between the same, a similar operation taking place at the tail stock centering device.

It is thus clear that centering means has been provided of a character such as to permit of the proper centering of coach wheels having external journals without the necessity of employing centering means such as must be applied to the journal previous to the mounting of the wheels in a lathe, the centering device herein provided being movable quickly to and from its operative engagement with the work and requiring no special effort on the part of the operator. At the same time such centering device is of a character such as to avoid any marring or deformation of the work, the driving of the latter being entirely accomplished by the use of driving dogs independent of such centering mechanism. It is also clear that when journals of other sizes are to be manipulated, it is merely necessary to remove the relatively small work-engaging shoes from the chuck jaws and to substitute therefor shoes of a different thickness and such as are suitable for the particular work to be done.

Under some circumstances, as for example, in the turning down of locomotive trailer wheels, the axles of which are of relatively large size, it may be found inexpedient to provide the lathe face plate with a central aperture of a size sufficient to house a centering chuck suitable for holding a journal of such large diameter, and to permit the lathe to be employed in manipulating such trailer wheels, the chuck has been removably supported within the lathe spindle as above pointed out. When, therefore, it is desired to use the lathe for such work, the operator by manipulating the hand wheel and nut 28 pushes the internal spindle 40 outwardly toward the outer surface of the face plate as indicated in Fig. 4. When in its outer position, the operator may introduce a wrench for removing the bolts 45, whereupon the entire centering chuck may be removed. A lathe center X of ordinary form may now be inserted in the socket 42 and the trailer journal C' inserted within the opening in the ring 10, with its end engaging such center.

As at times such lathes may be employed for turning pony truck wheels which have the journal portion of the axle arranged between the wheels, the centering devices hereinbefore referred to would be of no avail, as the centering chuck could not engage such journal surface nor could the ordinary center located within the socket 42 reach outwardly to a sufficient distance to engage the end of the wheel axle which end lies substantially in the plane of the outer face of the wheel.

For permitting the turning of such wheels the following arrangement may be employed, as indicated in Fig. 5. An extension spindle 62 is provided having a taper portion 63 at one end, adapted for engagement with the socket 42 of the spindle 40. This extension spindle comprises a substantially cylindrical body having adjacent one end an enlarged portion 64 provided with a peripheral bearing surface 65 adapted to fit snugly within the bore 66 of the ring 10, and to be guided thereby. The extension spindle 62 is provided at its outer end with a taper socket 67 in which may be seated an ordinary lathe center 68 provided with a conical end 69 for engagement with the end of the wheel axle $C^2$. When this arrangement is to be used, the centering chuck is removed in the manner above described and the operator inserts the extension spindle 62 within the hollow lathe spindle with its taper pin 63 engaging the socket 42 and with its surface 65 engaging the surface 66 of the ring 10. As thus arranged, the operator, by manipulation of the hand wheel and nut 28, may move the sleeve device comprising the members 17, 18 and the internal spindle 40 outwardly and inwardly, whereby to position the point 69 of the lathe center at the proper position for engagement with the work.

It is thus clear that the lathe has been provided with means whereby wheels of various types may properly be centered therein, such means being readily interchangeable and requiring no special care or skill on the part of the operator for making such interchange.

Although I have illustrated and described only one form of the invention and shown only three applications of it, I am aware of the fact that modifications can be made therein by any person skilled in the art without departing from the scope of the invention as expressed in the claims.

Having thus described the invention in a preferred embodiment of the same together with the make and use thereof, what I claim and desire to secure by Letters Patent of the United States is:

1. A wheel-turning lathe having a face plate and a centering chuck associated therewith, said chuck comprising a plurality of relatively movable jaws, each of said jaws having a longitudinal dove-tail slot therein, and bearing shoes provided with ribs interfitting with the respective slots so that they can be removed in an axial direction and having substantially smooth, work engaging faces.

2. A wheel-turning lathe comprising an internal spindle having a support secured to one end thereof, a plurality of relatively movable levers pivotally secured to said support, each provided with a work engaging jaw, resilient means normally tending to move said jaws away from the axis of the spindle, and means whereby said jaws may simultaneously be caused to approach said axis.

3. In combination in a wheel-turning lathe having a hollow spindle and a centrally apertured face plate secured thereto, work centering means arranged within the aperture in said face plate, a support for said work centering means, and means extending through said hollow spindle for connecting such work centering means with a pneumatic actuating device therefor.

4. A wheel-turning lathe of the class described comprising a hollow spindle having a face plate thereon, a sleeve slidable in the spindle, a supporting member secured to the end of said sleeve, clutch jaws pivotally secured to said support, means for reciprocating said sleeve within said spindle, and cooperating cam elements carried by said spindle and said jaws respectively, whereby, upon movement of said sleeve, said jaws are simultaneously rocked.

5. A wheel-turning lathe having a hollow spindle, an internal spindle slidable therein and having an axial socket in its end, a support removably secured to the end of said internal spindle and normally covering said socket, and clutch elements mounted on said support.

6. A wheel-turning lathe having a hollow spindle provided with a centrally apertured face plate, an internal spindle movable toward and from said face plate, means for so moving said spindle, a centering chuck comprising a support secured to said internal spindle, jaw members movably secured to said support, and cam means carried by said face plate and engaging said jaws, whereby, upon movement of said internal spindle, said jaws are caused to approach one another.

7. A wheel-turning lathe comprising an internal spindle, a plate removably secured to the end of said spindle, pairs of radially disposed lugs outstanding from one face of said plate, bell-crank lever members pivoted between the lugs of each of said pairs, spring means engaging one arm of each of said levers, and means comprising cam elements engageable with the opposite arms of said levers whereby to move said levers in opposition to said springs.

8. A wheel-turning lathe having a hollow spindle, a sleeve slidable therein, an internal spindle slidably mounted within said sleeve, said internal spindle having an axial socket, means for positively and simultaneously imparting similar movement to said sleeve and internal spindle, and means for moving said latter spindle relatively to said sleeve.

9. A wheel-turning lathe having a hollow spindle provided with a centrally apertured face plate, a sleeve device slidable in said spindle, means constraining said sleeve to rotate with the spindle, an internal spindle slidable within said sleeve, and having a plate secured to its end, movable clutch jaws mounted upon said plate, cam means mounted upon said hollow spindle and engaging said jaws, a rod passing into said sleeve and having one extremity secured to said internal spindle, and means engaging the other extremity of said rod whereby to impart sliding movement thereto and to said internal spindle.

10. In combination with a wheel-turning lathe having a hollow spindle and a centrally apertured face plate thereon, a multiple-jaw work-centering chuck arranged within the aperture of said spindle, the jaws of said chuck being provided with cam faces, a cam ring arranged concentrically with said aperture and engageable with the cam faces of said jaws, a support arranged within the spindle and upon which said jaws are movably mounted, a rod having one end thereof connected to said support and extending through said spindle, a piston secured to the opposite end of said rod, a cylinder normally bearing a fixed relationship to said spindle and enclosing said piston, and means whereby pressure fluid may be admitted to said cylinder for actuating said piston.

11. A wheel-turning lathe comprising a hollow spindle, a multi-jaw centering chuck arranged therein, means for supporting said chuck, manually actuable means for bodily displacing said supporting means and said chuck relatively to the spindle, and means for actuating the chuck jaws independently of said manually actuable means.

12. A wheel-turning lathe having a hollow spindle, a sleeve device slidable longitudinally of said spindle, an internal spindle slidable within a portion of said sleeve device, said sleeve device having an externally screw threaded portion, a manually adjustable nut rotatably connected to said hollow spindle and engaging said screw threads whereby upon rotation of said nut relatively to the hollow spindle, said sleeve device may be adjusted longitudinally of said spindle.

13. A wheel-turning lathe of the class described comprising a hollow spindle, a sleeve device slidable therein, said sleeve device comprising a portion extending beyond the end of said spindle and being externally screw threaded, a hand wheel rotatably mounted upon the end of said spindle and secured against endwise movement relative thereto, said hand wheel having an internally threaded bore engaging the threads of said sleeve, and an internal spindle arranged within said hollow spindle and slidably engaging a portion of said sleeve.

14. A wheel-turning lathe comprising a hollow spindle, a sleeve device therein providing guide means for an internal spindle, means normally operative to prevent longitudinal movement of said sleeve relative to said hollow spindle, a rod within said sleeve and having one end thereof connected to the internal spindle, a pneumatic cylinder mounted upon the extremity of said sleeve, and a piston within said cylinder having connection to the oposite end of said rod.

15. A wheel-turning lathe comprising a hollow spindle and a centrally apertured face plate having work driving dogs thereon, means associated with said spindle and face plate for holding a work centering chuck arranged within the aperture of said face plate, and an internally arranged spindle device having a socket for holding a lathe center.

Signed by me at Fitchburg, Mass., this ninth day of June, 1921.

FRANK DUSTAN.